US008807082B1

(12) United States Patent
Alfonso

(10) Patent No.: US 8,807,082 B1
(45) Date of Patent: Aug. 19, 2014

(54) FOOD BOWL FOR PETS

(71) Applicant: Lazaro G. Alfonso, Miami, FL (US)

(72) Inventor: Lazaro G. Alfonso, Miami, FL (US)

(*) Notice: Subject to any disclaimer, the term of this patent is extended or adjusted under 35 U.S.C. 154(b) by 0 days.

(21) Appl. No.: 13/912,530

(22) Filed: Jun. 7, 2013

Related U.S. Application Data

(60) Provisional application No. 61/683,083, filed on Aug. 14, 2012.

(51) Int. Cl.
*A01K 5/01* (2006.01)

(52) U.S. Cl.
USPC ..................... 119/61.53; 119/51.5

(58) Field of Classification Search
USPC ............... 119/61.53, 61.5, 61.54, 51.5
See application file for complete search history.

(56) References Cited

U.S. PATENT DOCUMENTS

| | | | | |
|---|---|---|---|---|
| 4,128,080 A | * | 12/1978 | Haney | 119/51.5 |
| 4,357,905 A | * | 11/1982 | Carpenter | 119/61.53 |
| 4,981,108 A | * | 1/1991 | Faeroe | 119/61.53 |
| D316,918 S | * | 5/1991 | Harris | D30/130 |
| 5,245,948 A | * | 9/1993 | McClellan | 119/51.5 |
| 5,253,609 A | * | 10/1993 | Partelow et al. | 119/61.53 |
| 5,277,149 A | * | 1/1994 | East | 119/51.5 |
| D362,090 S | * | 9/1995 | Baldwin et al. | D30/130 |
| 5,577,461 A | * | 11/1996 | Sebastian et al. | 119/51.5 |
| D379,684 S | * | 6/1997 | Dennis | D30/130 |
| 5,647,299 A | | 7/1997 | Pearson-Falcon | |
| 5,730,082 A | * | 3/1998 | Newman | 119/51.5 |
| 5,794,564 A | * | 8/1998 | Paro | 119/61.53 |
| 6,860,229 B1 | * | 3/2005 | Craft | 119/61.5 |
| D504,197 S | * | 4/2005 | Huthmaker et al. | D30/129 |
| 7,219,622 B1 | * | 5/2007 | Powers | 119/61.53 |

* cited by examiner

*Primary Examiner* — Yvonne Abbott
(74) *Attorney, Agent, or Firm* — Albert Bordas, P.A.

(57) ABSTRACT

A pet food dish assembly, having a food container with a first container section, and a first bottom edge; and a water container having at least second and third container sections, a first exterior sidewall, a top wall, and a second bottom edge. The top wall has a channel extending between the second and third container sections. The food container mounts onto the water container over the second container section. The first bottom edge is elevated above the top wall when the food container is mounted onto the water container. The food container further has a second exterior sidewall with at least one cutout. The at least one cutout aligns with the channel when the food container is mounted onto the water container. The second container section stores liquid matter to create a barrier to prevent access to and/or contamination of the food container by crawling insects.

17 Claims, 3 Drawing Sheets

FOOD BOWL FOR PETS

BACKGROUND OF THE INVENTION

1. Field of the Invention

The present invention relates to pet accessories, and more particularly, to pet food dish assemblies.

2. Other Related Applications

The present application claims priority of pending U.S. Provisional Application No. 61/683,083, filed on Aug. 14, 2012, which is hereby incorporated by reference.

3. Description of the Related Art

Known pet food containers are widely used in outdoor areas and are at risk of being overrun by crawling insects. Several food bowls for pets have been designed in the past with the intent of preventing ant and insect access to pet food.

Applicant believes that one of the closest references corresponds to U.S. Pat. No. 5,647,299 B1 issued to Pearson-Falcon on Jul. 15, 1997 for a pet food bowl. However, it differs from the present invention because Pearson-Falcon teaches a pet food bowl that includes a protection against small crawling insects to prevent the latter from reaching the food contained therein. The bowl has a container assembly and a protective removable annular cover that can be readily mounted over the water channel formed in said bowl. The design is particularly helpful for cleaning the bowl and having access to all of its parts. The lower peripheral wall extends outwardly at an angle to improve the structural stability of the bowl and preventing accidentally tipping it over. The cover includes a slanted wall that matches the inclination of the upper wall so that it can be aligned and frictionally locked in place, if needed. The water channel that prevents the small insects from crossing to the area where the food is has sufficiently large dimensions to prevent the average insect from reaching it. The opening between the cover and the channel is sufficiently small to prevent the pet from drinking the water.

Other patents describing the closest subject matter provide for a number of more or less complicated features that fail to solve the problem in an efficient and economical way. None of these patents suggest the novel features of the present invention.

SUMMARY OF THE INVENTION

The present invention relates to a pet food dish assembly, which can be readily deployed to provide a food container elevated above a water container to create a liquid matter barrier against insects. The food container is removably mounted on a post assembly rising out from the water container base to create a liquid matter barrier between a water container top wall and a bottom edge of the food container.

More specifically, the present invention is a pet food dish assembly, comprising a food container having a first container section, and a first bottom edge; and a water container having at least second and third container sections, a first exterior sidewall, a top wall, and a second bottom edge. The top wall has a channel extending between the second and third container sections. The food container mounts onto the water container over the second container section.

The first bottom edge is elevated above the top wall when the food container is mounted onto the water container. The food container further comprises a second exterior sidewall with at least one cutout. The at least one cutout aligns with the channel when the food container is mounted onto the water container.

In a preferred embodiment, the second and third container sections store water to create a water barrier to prevent access to and/or contamination of the food container by crawling insects. In an alternate embodiment, the second container section stores liquid matter to create a barrier to prevent access to and/or contamination of the food container by crawling insects.

The water container further comprises a first top edge, a first interior sidewall, and a first base to define the second container section.

The water container further comprises a post assembly extending from the first base to elevate the food container when mounted onto the water container. The post assembly comprises a shaft extending from a post base to an end. The post assembly comprises a head mounted onto the end that receives a respective fastening assembly of the food container when mounted onto the water container.

The water container further comprises a second top edge, a second interior sidewall, and a second base to define the third container section. The food container further comprises a third top edge, a third interior sidewall, and a third base to define the first container section.

The channel is defined by first and second channel sidewalls and a channel base wall. The first and second channel sidewalls extend from the top wall towards the first and second bases.

It is therefore one of the main objects of the present invention to provide a pet food dish assembly that creates a barrier to prevent access to and/or contamination of the food container by crawling insects.

It is another object of this invention to provide a pet food dish assembly comprising a container section for pet food, another container section for drinking water and yet another container section for liquid matter that creates the barrier to prevent access to and/or contamination of the food container by the crawling insects.

It is another object of this invention to provide a pet food dish assembly comprising the container section for pet food disposed at a higher level to create a comfortable height suitable for a pet to swallow its food.

It is another object of this invention to provide a pet food dish assembly comprising a food container that is removably mounted onto a water container.

It is another object of this invention to provide a pet food dish assembly that is volumetrically efficient for carrying, transporting, and storage.

It is another object of this invention to provide a pet food dish assembly that can be readily assembled and disassembled without the need of any special tools.

It is another object of this invention to provide a pet food dish assembly that is of a durable and reliable construction.

It is yet another object of this invention to provide such a pet food dish assembly that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
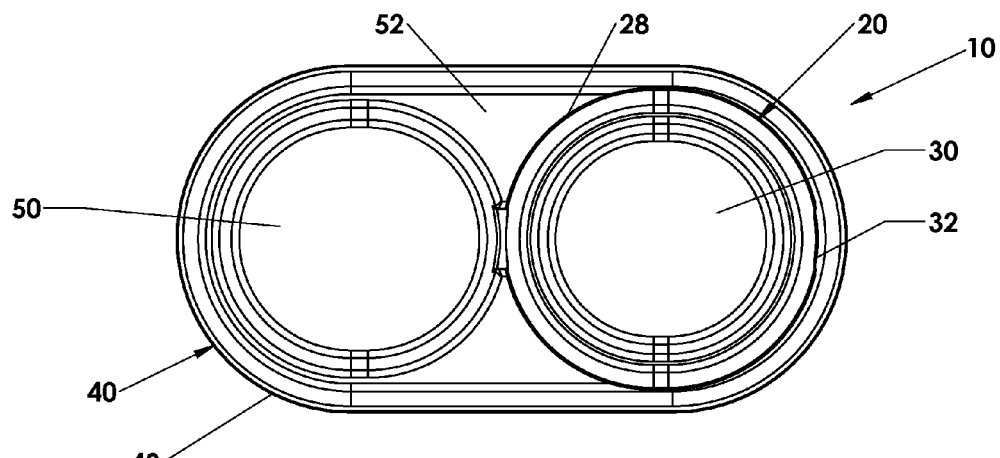
FIG. 1 is a top view of the present invention.

Referring now to the drawings, the present invention is a pet food dish assembly and is generally referred to with numeral 10. It can be observed that it basically includes food container 20 and water container 40.

Figure 2:
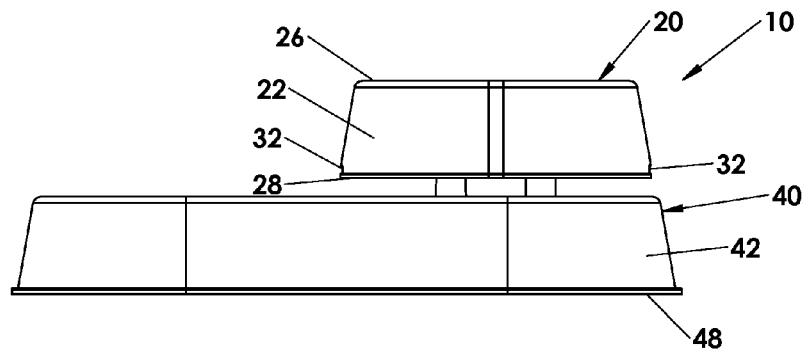
FIG. 2 is a front view of the present invention.
Figure 3:
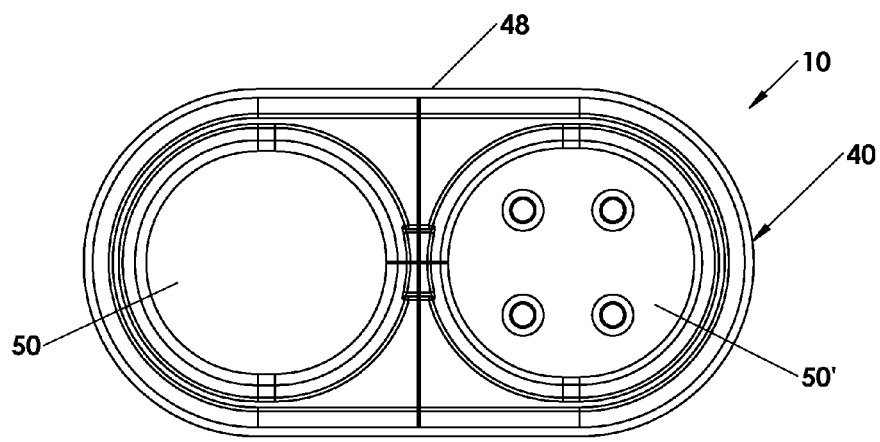
FIG. 3 is a bottom view of the present invention.
Figure 4:
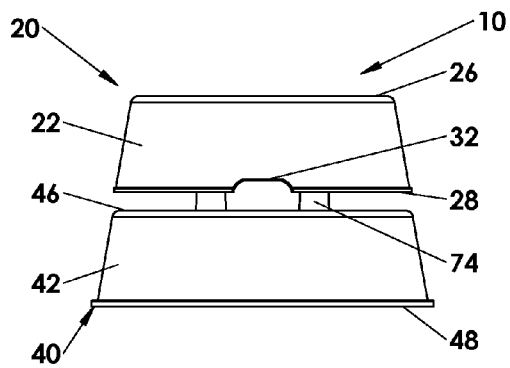
FIG. 4 is a left side view of the present invention.

As seen in FIGS. 1, 2, 3, and 4, present invention 10 is configured to ensure the isolation of food, not seen, within food container 20, positioned above water container 40, by creating a barrier to prevent access to and/or contamination of food container 20 by crawling insects, not seen. Food container 20 comprises a container section defined by top edge 26, interior sidewall 24, and base 30. As seen in FIGS. 2 and 4, food container 20 also comprises bottom edge 28.

Figure 5:
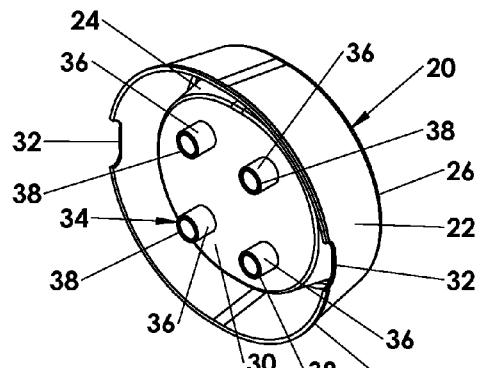
FIG. 5 is a bottom isometric view of the food container.

As seen in FIG. 5, protruding downwardly from base 30 is fastening assembly 34. Fastening assembly 34 comprises cylindrical members 36 having edges 38. Each fastening assembly 34 secures onto a respective head 78 of post assembly 70.

Figure 6:
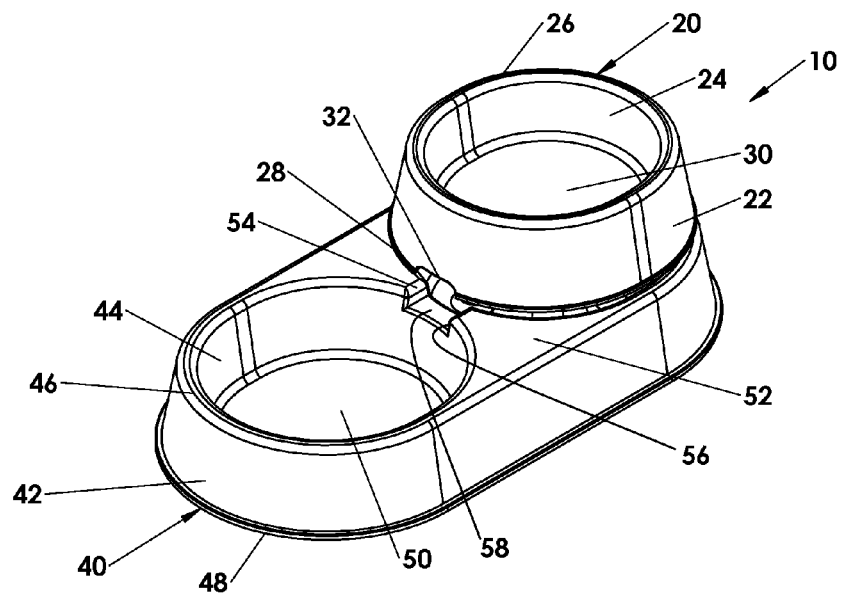
FIG. 6 is an isometric view of the present invention.
Figure 7:
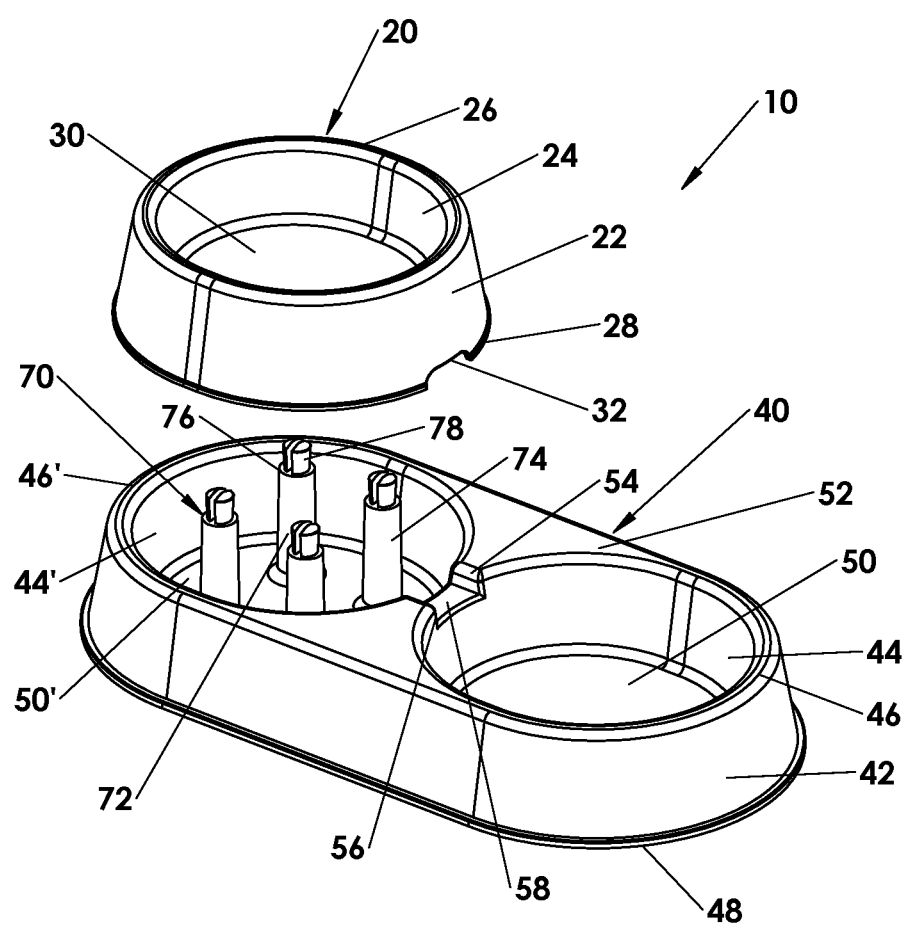
FIG. 7 is an isometric view of the present invention, showing the food container detached from the water container.

As seen in FIGS. 6 and 7, water container 40 has at least two container sections. One container section is defined by top edge 46, interior sidewall 44, and base 50. The other container section is defined by top edge 46', interior sidewall 44', and base 50'. In a preferred embodiment, the container sections of water container 40 store water to create a water barrier to prevent access to and/or contamination of food container 20 by the crawling insects.

Water container 40 also comprises exterior sidewall 42, top wall 52, and bottom edge 48. Top wall 52 has a channel extending between the two container sections of water container 40. The channel is defined by channel sidewalls 54 and 56 and channel base wall 58. Channel sidewalls 54 and 56 extend from top wall 52 towards bases 50 and 50'.

Water container 40 further comprises post assembly 70 extending upwardly from base 50' to elevate food container 20 when mounted onto water container 40. Post assembly 70 comprises at least one shaft 74 that extends from post base 72 to end 76. Each shaft 74 further comprises head 78 mounted onto end 76. End 76 has resilient characteristics to removably engage fastening assembly 34. Each edge 38 of a respective cylindrical member 36 rests onto respective end 76 of shaft 74 when food container 20 is mounted onto water container 40.

Food container 20 mounts onto water container 40 over the container section defined by top edge 46', interior sidewall 44', and base 50'. Bottom edge 28 is elevated above top wall 52 when food container 20 is mounted onto water container 40, so crawling insects cannot access food container 20. The disposition of food container 20 at a higher level provides a comfortable height suitable for a pet to swallow its food.

Food container 20 further comprises exterior sidewall 22. Exterior sidewall 22 has at least one cutout 32. Cutout 32 aligns with the water channel defined by channel sidewalls 54 and 56 and channel base wall 58, when food container 20 is mounted onto water container 40.

In use, water may be poured onto base 50. Once that container section is filled, water may flow onto base 50' via the channel until it too is nearly full to create the water barrier to prevent access to and/or contamination of food container 20 by the crawling insects.

In an alternate use, water is poured onto base 50 to only fill that container section; and any other matter, liquid matter, including water may be placed onto base 50' as a deterrent and/or to create a barrier to prevent access to and/or contamination of food container 20 by the crawling insects. Such a deterrent can be, but is not limited to, oils.

As best seen in FIG. 7, present invention 10 can be readily assembled and disassembled. It is noted that present invention 10 can be taller or shorter to accommodate an ergonomic and/or comfortable height for different sized pets.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A pet food dish assembly, comprising:
   A) a food container having a first container section, and a first bottom edge, said food container further comprises a first exterior sidewall with at least one cutout; and
   B) a water container having at least second and third container sections, a second exterior sidewall, a top wall, and a second bottom edge, said top wall has a channel extending between said second and third container sections, said food container mounts onto said water container over said second container section, said at least one cutout aligns with said channel when said food container is mounted onto said water container.

2. The pet food dish assembly set forth in claim 1, further characterized in that said first bottom edge is elevated above said top wall when said food container is mounted onto said water container.

3. The pet food dish assembly set forth in claim 1, further characterized in that said second container section stores liquid matter to create a barrier to prevent access to and/or contamination of said food container by crawling insects.

4. The pet food dish assembly set forth in claim 1, further characterized in that said water container further comprises a first top edge, a first interior sidewall, and a first base to define said second container section.

5. The pet food dish assembly set forth in claim 4, further characterized in that said water container further comprises a post assembly extending from said first base to elevate said food container when mounted onto said water container.

6. The pet food dish assembly set forth in claim 5, further characterized in that said post assembly comprises at least one shaft extending from a post base to an end.

7. The pet food dish assembly set forth in claim 6, further characterized in that said at least one shaft comprises a head mounted onto said end that receives a respective fastening assembly of said food container when mounted onto said water container.

8. The pet food dish assembly set forth in claim 4, further characterized in that said water container further comprises a second top edge, a second interior sidewall, and a second base to define said third container section.

9. The pet food dish assembly set forth in claim 8, further characterized in that said food container further comprises a third top edge, a third interior sidewall, and a third base to define said first container section.

10. The pet food dish assembly set forth in claim 1, further characterized in that said channel is defined by first and second channel sidewalls and a channel base wall.

11. The pet food dish assembly set forth in claim 10, further characterized in that said first and second channel sidewalls extend from said top wall towards said first and second bases.

12. A pet food dish assembly, comprising:
A) a food container having a first container section, and a first bottom edge, said food container further comprises a first exterior sidewall with at least one cutout; and
B) a water container having at least second and third container sections, a second exterior sidewall, a top wall, and a second bottom edge, said top wall has a channel extending between said second and third container sections, said channel defined by first and second channel sidewalls and a channel base wall, said food container mounts onto said water container over said second container section, and said second container section stores liquid matter to create a barrier to prevent access to and/or contamination of said food container by crawling insects, said at least one cutout aligns with said channel when said food container is mounted onto said water container.

13. The pet food dish assembly set forth in claim 12, further characterized in that said first bottom edge is elevated above said top wall when said food container is mounted onto said water container.

14. The pet food dish assembly set forth in claim 12, further characterized in that said water container further comprises a first top edge, a first interior sidewall, and a first base to define said second container section, said water container further comprises a post assembly extending from said first base to elevate said food container when mounted onto said water container.

15. The pet food dish assembly set forth in claim 14, further characterized in that said post assembly comprises at least one shaft extending from a post base to an end, said at least one shaft further comprises a head mounted onto said end that receives a respective fastening assembly of said food container when mounted onto said water container.

16. The pet food dish assembly set forth in claim 12, further characterized in that said water container further comprises a second top edge, a second interior sidewall, and a second base to define said third container section.

17. The pet food dish assembly set forth in claim 16, further characterized in that said food container further comprises a third top edge, a third interior sidewall, and a third base to define said first container section.

* * * * *